US009984402B2

(12) United States Patent
Cao (10) Patent No.: US 9,984,402 B2
(45) Date of Patent: May 29, 2018

(54) METHOD, SYSTEM, AND COMPUTER PROGRAM PRODUCT FOR RECOMMENDING ONLINE PRODUCTS

(71) Applicant: Alibaba Group Holding Limited, George Town (KY)

(72) Inventor: Yang Cao, Hangzhou (CN)

(73) Assignee: Alibaba Group Holding Limited (KY)

( * ) Notice: Subject to any disclaimer, the term of this patent is extended or adjusted under 35 U.S.C. 154(b) by 602 days.

(21) Appl. No.: 14/461,139

(22) Filed: Aug. 15, 2014

(65) Prior Publication Data
US 2015/0058160 A1     Feb. 26, 2015

(30) Foreign Application Priority Data
Aug. 26, 2013   (CN) .......................... 2013 1 0376347

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06F 17/3025* (2013.01); *G06F 17/30247* (2013.01);
(Continued)

(58) Field of Classification Search
CPC ................ G06C 30/0282; G06C 30/06; G06C 30/0631; G06C 30/0623; G06C 30/0643;
(Continued)

(56) References Cited

U.S. PATENT DOCUMENTS 7,305,151 B2   12/2007   Shiiyama
7,809,601 B2   10/2010   Shaya et al.
(Continued)

FOREIGN PATENT DOCUMENTS

JP   2003303188   10/2003
JP   2007199749    8/2007
(Continued)

OTHER PUBLICATIONS

Dusto, Amy; New Technology Helps Shoppers Find Products Based on Their Pictures. Apr. 10, 2013 (Apr. 10, 2013). Accessed via: https://www.digitalcommerce360.com/2013/04/10/new-technology-helps-shoppers-find-products-based-their-pics/.*
(Continued)

*Primary Examiner* — Resha Desai
*Assistant Examiner* — Allison G Wood
(74) *Attorney, Agent, or Firm* — Van Pelt, Yi & James LLP (57) ABSTRACT

Embodiments of the present application relate to a method for recommending online products, a system for recommending online products, and a computer program product for recommending online products. A method for recommending online products is provided. The method includes specifying a main product zone of a query product image, dividing the main product zone into a plurality of local zones, extracting color features from each local zone, looking up candidate recommended product images sharing common characteristics with a query product image based on the color features of each local zone, matching, among the found candidate recommended product images, product images that are similar in terms of color matching to the query product image, and regarding the matched product images as recommended product images.

15 Claims, 6 Drawing Sheets

(51) Int. Cl.
   *G06K 9/36* (2006.01)
   *G06K 9/46* (2006.01)
   *G06T 7/60* (2017.01)
   *G06F 17/30* (2006.01)
   *G06T 7/66* (2017.01)
   *G06T 7/00* (2017.01)
   *G06T 7/90* (2017.01)

(52) U.S. Cl.
   CPC ......... *G06F 17/30256* (2013.01); *G06K 9/36* (2013.01); *G06K 9/46* (2013.01); *G06K 9/4676* (2013.01); *G06Q 30/0623* (2013.01); *G06Q 30/0625* (2013.01); *G06Q 30/0629* (2013.01); *G06T 7/0002* (2013.01); *G06T 7/60* (2013.01); *G06T 7/66* (2017.01); *G06T 7/90* (2017.01)

(58) Field of Classification Search
   CPC ............ G06C 30/0601; G06C 30/0625; G06C 30/0629; G06T 7/90; G06T 7/60; G06T 7/10; G06T 7/0002; G06T 7/66; G06F 17/30; G06F 17/3025; G06F 17/30256; G06F 17/30247; G06K 9/46; G06K 9/4676
   USPC .... 705/26.1–27.2, 26.61, 26.64, 26.7, 26.62; 707/736, 742, 749; 382/305, 376, 288
   See application file for complete search history.

(56) References Cited

U.S. PATENT DOCUMENTS

| | | | |
|---|---|---|---|
| 7,856,144 | B2 | 12/2010 | Matsushita |
| 8,320,671 | B1 | 11/2012 | Zoghlami |
| 2003/0208399 | A1 | 11/2003 | Basak et al. |
| 2009/0144173 | A1* | 6/2009 | Mo ........................ G06N 3/006 705/26.1 |
| 2011/0016001 | A1* | 1/2011 | Schieffelin ........... A61B 5/0059 705/14.66 |
| 2011/0314031 | A1* | 12/2011 | Chittar ................ G06F 17/3025 707/749 |
| 2014/0033829 | A1 | 2/2014 | Xia et al. |

FOREIGN PATENT DOCUMENTS

| | | |
|---|---|---|
| JP | 2009251850 | 10/2009 |
| JP | 2013033392 | 2/2013 |
| KR | 20100027722 | 3/2010 |
| WO | 0054181 | 9/2000 |

OTHER PUBLICATIONS

Takachi et al: Bargain Sale Information Antenna Using Visual Search, The 15th Workshop on Interactive Systems and Software, Japan, Japan Society for Software Science and Technology 'ISS Workshop', Nov. 10, 2015, pp. I-6.

* cited by examiner

METHOD, SYSTEM, AND COMPUTER PROGRAM PRODUCT FOR RECOMMENDING ONLINE PRODUCTS

CROSS REFERENCE TO OTHER APPLICATIONS

This application claims priority to People's Republic of China Patent Application No. 201310376347.1 entitled A METHOD AND DEVICE FOR RECOMMENDING ONLINE PRODUCTS, filed Aug. 26, 2013 which is incorporated herein by reference for all purposes.

FIELD OF THE INVENTION

The present application relates to a method and system for recommending online products.

BACKGROUND OF THE INVENTION

Online shopping has become a common means of shopping, and a large selection of merchandise exists on websites such as Taobao and Tmall for consumers to choose from. However, due to the large selection of merchandise, consumers typically have to spend a great deal of effort to locate an appropriate product. When consumers indicate an interest in a product (by clicking or bookmarking the product), similar products in the Web can be automatically located to help reduce the effort spent by the consumer in locating appropriate products. Consumers would thus avoid numerous searches and price comparisons, and reduce overall efforts in purchasing a product. In particular, when an original product selected by a consumer is inappropriately priced, missing a size, or unsatisfactory in some other aspect, the consumer would like to conveniently continue to browse through the merchandise. Thus, bounces are avoided, and conversion rates are increased. A conversion rate refers to the probability a customer would click a product on the page to obtain a more detailed web page during a browsing session. A bounce typically means that a customer gives up on locating the appropriate product and leaves the web page. The bounce also indicates that the present web page is not satisfactory.

On shopping websites, shopping advice columns or special articles are frequently written to guide purchases. These columns or articles present products, and the presented products are consistent in terms of design and style and comply with seasonal marketing themes. Prior to similar product recommendation engines, selections were typically made manually from a large pool of products. This selection process expended a large amount of manual effort and did not ensure a definite recall rate. With similar recommendation technology, the selection process only needs to designate seed products. The seed products refer to sample products, from which the recommendation engine could analyze visual elements, to look for more similar products. The similar product recommendation engine then quickly and accurately locates similar products throughout the Web, and automatically creates special articles or columns.

Currently, many implementation schemes for similar product recommendation technologies exist. A traditional similar product recommendation technology is based on text recommendations. In other words, product inter-relationships are established through descriptive text relating to the products themselves. Typically, the descriptive text is written by website sellers, and quality of the descriptive text varies greatly. Often, fraudulent conduct involving various kinds of inappropriate titles or descriptions occurs. Accordingly, recommendation results of the traditional similar product recommendation technology may have limited utility.

Another popular recommendation technology involves the following: products are recommended to consumers by relating user behaviors, such as repeated viewing or repeated purchases, to the products. In other words, the recommendation technology involves the following: by reviewing historical data, the system finds that most consumers of one type have expressed an inclination towards this product. The recommended products are those products towards which the type of consumers has also been typically inclined. This recommendation technology can increase conversion rates. However, since the recommendation technology does not include having an understanding of the product content, but instead merely simulates consumer habitual behavior, the recommendation results of the recommendation technology cannot be controlled. Thus, ensuring consistency or stability of the recommendation results of the recommendation technology is difficult. For example, the system is not capable of knowing if the reason for the relationship between a product in which a consumer is interested and recommended products is due to color matching, style design, artificially guided traffic behavior, or merely the fact that two products are placed close to each other. Therefore, this type of recommendation technology can only recommend products to consumers, and cannot serve as a product recommendation engine. In particular, this type of recommendation technology relies on vast amounts of historical data, and can run into cold starts, data sparsity, and other such problems which can affect the recommendation results. Data sparsity refers to a difficulty in recommending similar products due to a lack of related historical data. A cold start is a specific example of data sparsity, which refers to a recommendation engine just beginning to execute so most products to be recommended suffer from a lack of historical data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Image search technologies under big data conditions began to appear nearly twenty years ago. The image search technologies relate to index volumes, accuracy rates, recall rates, corresponding times, etc.

Currently, image search engines seek to locate the same objects (products) in different environments with different affine transformations. Affine transformations include translation, scaling, rotation, etc. In other words, the image search engines search for "the same" products that may appear differently in different images. For example, the searching includes: first detecting and extracting local features from images, and quantifying the extracted local features in high-dimensional spaces as individual "visual words." Local features that are merged into the same word are regarded as locally representing the same object under different affine transformations. The same object (product) is retrieved, with acceleration from an inverted index, by matching the visual words of objects being searched to visual words representing the target object. Acceleration is a technique used by recommendation engines using inverted index structures. The recommendation engines using inverted index structures perform acceleration by checking products that have the same words as the query product instead of checking every candidate product, reducing computation time. However, to find similar products, there are significant differences between the query product and target products, so finding the same products using the same recommendation engine is very difficult.

In recommendation application scenarios, if a search engine can only retrieve the same objects, the search engine obviously will cause price comparison behaviors and will thus affect commercial values of product recommendations. As an example, in some application scenarios, consumers would like to view a greater number of similar yet different products to locate a greater range of products to select from.

In online shopping, products are presented in many different forms, with various backgrounds. The typical image search engine processes entire images to establish indices or launch searches and can unavoidably recall inappropriate images because the inappropriate images have similar backgrounds as the query image.

Currently, schemes for recommending products in online shopping include: a dominant color method and a texture method referred to as "Tao Tao search."

In the dominant color method, 1 to N dominant colors are extracted from each image. In some embodiments, the 1 to N dominant colors are represented as a probability distribution. In some embodiments, a similarity in terms of dominant colors between two products is obtained based on calculations or another probability-measure distribution technique. As an aspect, the dominant color method only extracts a few dominant colors, which overall has a limited sensory impact, but does not effectively compare the similarity between the two products in terms of color matching. This limited sensory impact can be shown as patterns and decorative figures. At the same time, since structural information of the product has been lost, local matching results may be incorrect for a product. For example, with the dominant color method, an image of a shirt that is red on top and yellow on the bottom can be determined to be similar to an image in which another shirt is yellow on the top and red on the bottom.

For similar-color recommendations based on the texture method, if actual recommendation results are examined, a very large background effect on the recommendation results can exist. Moreover, the similar-color recommendations based on the texture method give excessive consideration to textual and other features when sorting the results. In other words, avoiding incorrect recalls resulting from backgrounds can be very difficult. Recommendation error rates of the similar-color recommendations based on the texture method are still relatively high.

Figure 1:
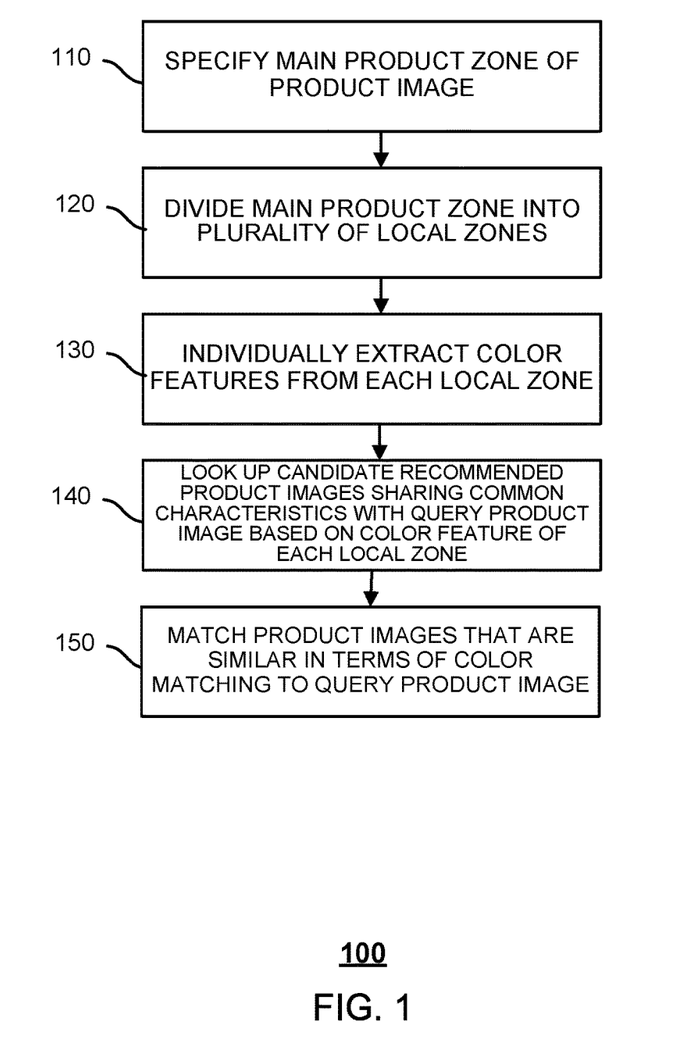
FIG. 1 is a flowchart of an embodiment of a process for recommending online products.

FIG. 1 is a flowchart of an embodiment of a process for recommending online products. In some embodiments, the process 100 is implemented by a server 520 of FIG. 5 and comprises:

In 110, a main product zone of a product image is specified. In some embodiments, product images are first reduced according to length and other ratios to standard-size images having a length of 128 pixels as their longest side. In addition, the server determines the zone where the main product is located, i.e., the main product zone. A number of existing specifying techniques for detecting the main product zone can be used, such as the technique found in the specification of the Chinese patent application titled "Method and Apparatus for Extracting Main Products from Product Pictures" (Appl. No. 201210279081.4), which the applicant filed on Aug. 4, 2012 in the Chinese Patent Office. Accordingly, the various specifying techniques will not be discussed further here for conciseness. Further, other specifying techniques can be employed to specify the main product zone. Data involved in the processing of the product images are only provided as illustrative examples. In other words, as long as the product images remain consistent in overall processing, the main product zone can be any reasonable size.

In 120, the main product zone is divided into a plurality of local zones.

In 130, color features are individually extracted from each local zone.

In some embodiments, after specifying the main product zone, the server removes image background from the main product zone and calculates a center of gravity of the modified main product zone. The server subsequently aligns the center of gravity with a center of a 128×128 pixel image. Then, the server divides the 128×128 pixel image into, for example, 8×8 equidistant zones (local zones). Each of these equidistant zones corresponds to a square having a dimension of 16×16. In this way, the main product zone is cut up into r=64 local zones, and r represents the number of local zones in each product image.

The overall color space is equally divided under a hue and a saturation and brightness (HSV) space. For example, the hue (H) space is divided into 12 equal portions and the saturation (S) and brightness (V) spaces are simultaneously considered and divided into 3 equal portions. In this way, the overall color space of each local zone is equally divided in the HSV space into a total of 36 equal portions. These 36 equal portions plus 3 equal parts (black, white, and grey) of grey space add up to a total of 39 colors. A color histogram count based on the obtained 39 colors is performed for each local zone. In other words, for each pixel, one of these 39 colors is assigned to the each pixel based on a nearest color principle. As for the color of pixels from the removed background, the color of pixels from the removed background is defined as a 40th color. Thus, in this example, each local zone is represented as a 40-dimension feature vector. The 40-dimension feature vector corresponds to a probability distribution of the local zone over m=40 colors. In this example, m represents a quantity of colors contained in each local zone.

After the color feature extraction is performed, each product image is represented as w=r×m=64×40=2,560 high-dimensional vectors. In this example, w represents the quantity of high-dimensional vectors contained in each product image. Each dimension is regarded as a color word, and a probability distribution of each dimension is quantified as 0 to 255, which corresponds to a word frequency of a word. Thus, each image is represented as a "document" of 1 to 2,560 words, each word having a word frequency. According to this process, an inverted index is established for the recommendable product image. The inverted index has 2,560 entries, and each entry of the inverted index includes a document number for all occurring words and a word frequency of a word within the document.

Operations 110-130 rely on the specifying of the main product zone and the alignment of the center of gravity of the main product zone to avoid incorrect alignment caused by background or main product shifts. The colors of each local zone are divided into a certain number of portions, such as 40. In other words, the specifying of the main product zone and the alignment of the center of gravity ensure a color matching accuracy rate while also tolerating to a certain degree gradual changes in local color.

In 140, the server looks up, in a database of product images, candidate recommended product images sharing common characteristics with the query product image based on the color features of each local zone. An example of a common characteristic is a color distribution.

Given a query product image P, inverted index entries corresponding to word frequencies in P are accessed in succession. Thus, the server thereupon determines in which documents occur word frequencies that occur in P. As for a candidate recommended product image Q, similarity definition formula (1) for the recommendable product image Q and the query product image P is:

$$sim(P, Q) = \sum_{i=1}^{w} \frac{p_i q_i}{|P||Q|} \quad (1)$$

In formula (1), w represents a quantity of high-dimensional vectors contained in each product image, w=r×m, r represents a quantity of local zones into which each image has been divided, m represents a quantity of colors contained in each local zone, ‖ represents a modulus operator, $$|P| = \sqrt{\sum_{i=1}^{w} p_i^2}, |Q| = \sqrt{\sum_{i=1}^{w} p_i^2}, p_i$$

represents a word frequency corresponding to an $i^{th}$ high-dimensional vector element within the query product image P, $q_i$ represents a word frequency corresponding to an $i^{th}$ high-dimensional vector element within the query product image Q, and a background zone word frequency is zero. The formula (1) is used to measure a cosine of an angle in a high-dimensional space between two high-dimensional vectors composed of the word frequencies of the query product image P and the recommendable product image Q. The larger the result obtained through the formula (1) calculation, the smaller the angle is between the two high-dimensional angles, i.e., the more similar are their directions. This signifies a greater commonality with respect to color matching between the two corresponding images.

Please note that, in the color features of each local zone, the 40th dimension is the background color. In the sorting involved in this operation, the 40th dimension word frequency is defined as zero for each local zone. In the overall product image, word frequencies corresponding to the 40th, 80th, . . . , and 2,650th high-dimensional vectors are all zero. Consequently, these two local zones are believed to be similar. The server selects a top-ranked preset quantity M recommendable product images from the calculated results as candidate recommended product images. M is an integer greater than one. Thus, a situation where a query product image and a candidate recommended product image are considered to be similar due to both images having similar area proportions of backgrounds can be effectively avoided.

Using an inverted index ensures that two documents will be computed and compared only if the two documents share words. Therefore, formula (1) can be used to speed up similar product image searches where large amounts of data exist.

In this operation, the server acquires similarity rankings for recommended product images having common characteristics with the query product image.

In 150, the server matches, among the determined candidate recommended product images, product images that are similar in terms of color matching to the query product image, and determines the product images that are similar in terms of color matching to the query product image as recommended product images.

In this operation, the first M (a preset quantity) recommendable product images are selected from the ranked recommendable product images obtained in 140. M is an integer greater than one. These images have the highest commonality with respect to the query product image. In some embodiments, matching calculations are performed individually on the M candidate recommended product images based on formula (2) to calculate a similarity colorsim (P,Q) in terms of color matching of each candidate recommended product image Q among the M candidate recommended product images and the query product image P:

$$colorsim(P, Q) = \sum_{j=1}^{r} colorsim(P_j, Q_j) \quad (2)$$

In formula (2), r represents a quantity of local zones into which each image has been divided.

In formula (2), $$colorsim(P_j, Q_j) = \chi^2(P_j, Q_j) = \frac{1}{2}\sum_{k=1}^{m} \frac{(p_k - q_k)^2}{p_k + q_k},$$

where m represents a quantity of colors included in each local zone.

With formula (2), calculating the color similarities between the M candidate recommended product images and the query product image is possible. From these M candidate recommended images, the server acquires a preset quantity N product images which are top-ranked by similarity (N being an integer greater than one). These N product images are the final recommended product images which are similar to the query product image in terms of color matching. Formula (2) is used to measure color (word frequency) distribution differences between the query product image P and the candidate recommended product image Q among the M candidate recommended product images. Moreover, where both images have a large amount of shared colors, and the two images share dominant hues, formula (2) will reduce the differences of the two images with respect to these color intervals. Regarding the details or different color portions of the two images, formula (2) will increase the differences relating to these color intervals. Therefore, formula (2) accurately illustrates the color matching differences between images.

In this operation, a similarity threshold value can be preset, the product images having a similarity degree greater than the preset value from the M candidate recommended product images can be taken, and the product images can be regarded as recommended product images.

Regarding certain query product images, if no recommendation results are obtained according to the process 100, no product image similar to the query product image in terms of color matching exists. Accordingly, the product displayed by the query product image can be concluded to be a novel product.

The process 100 provides a true color matching algorithm which identifies candidate recommended product images that share a common characteristic such as a color distribution with the query product image based on color features of each local zone within a product image and then performs an even more detailed color matching comparison of the candidate recommended product images with the query product image. In addition, by relying on inverted indices to complete searches for similar product images having common characteristics, the speed of processing vast amounts of data is increased. Time-consuming color matching comparisons are reduced to a small quantity of candidate recommended product images. Therefore, the process 100 has a relatively high query speed. Moreover, following two similarity screenings, the recommendation of similar products in terms of color matching is achieved and recommendation accuracy is increased.

In some embodiments, the process 100 uses only product images. Cold starts, scarcity, and other such problems do not occur. For the consumer, the recommendations have a clear-cut expectation, i.e., the color matching is similar. Therefore, the process 100 is not only suitable for various recommendations, advertising, purchase guides, and other such services for consumers, it can also serve as a basic tool for operators. The process 100 can automatically identify products that belong to the same line and thereby achieve automation of marketing and purchasing guidance.

Figure 2:
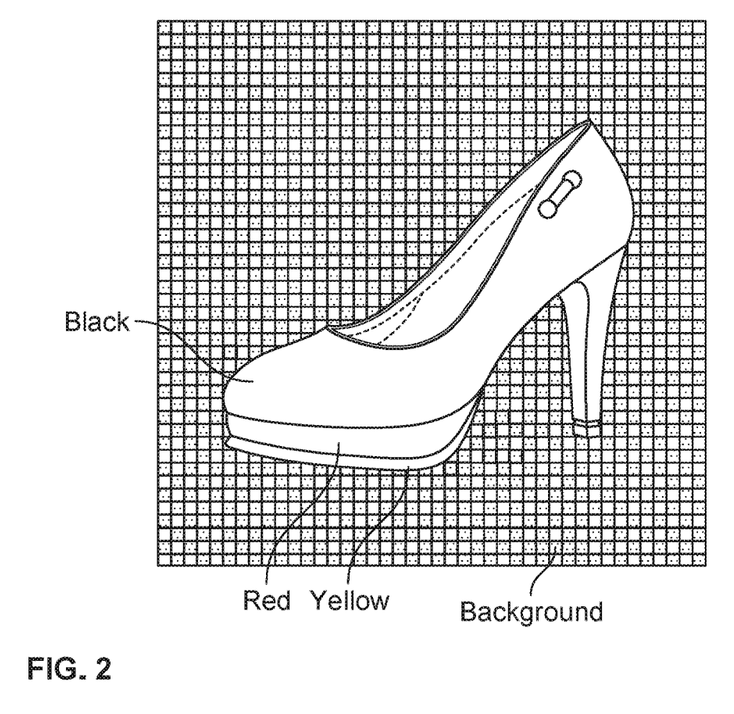
FIG. 2 is a diagram of an example of a query product image.

FIG. 2 is a diagram of an example of a query product image. Assume that product recommendations are sought for the high-heeled shoes shown in FIG. 2. First, the queried high-heeled shoe image undergoes a main product zone specifying, as shown in the right-hand figure in FIG. 2. After a center of the main product zone has been determined, the main product zone is divided into a plurality of local zones or blocks, and a color distribution is obtained for each local zone or block.

Figure 3:
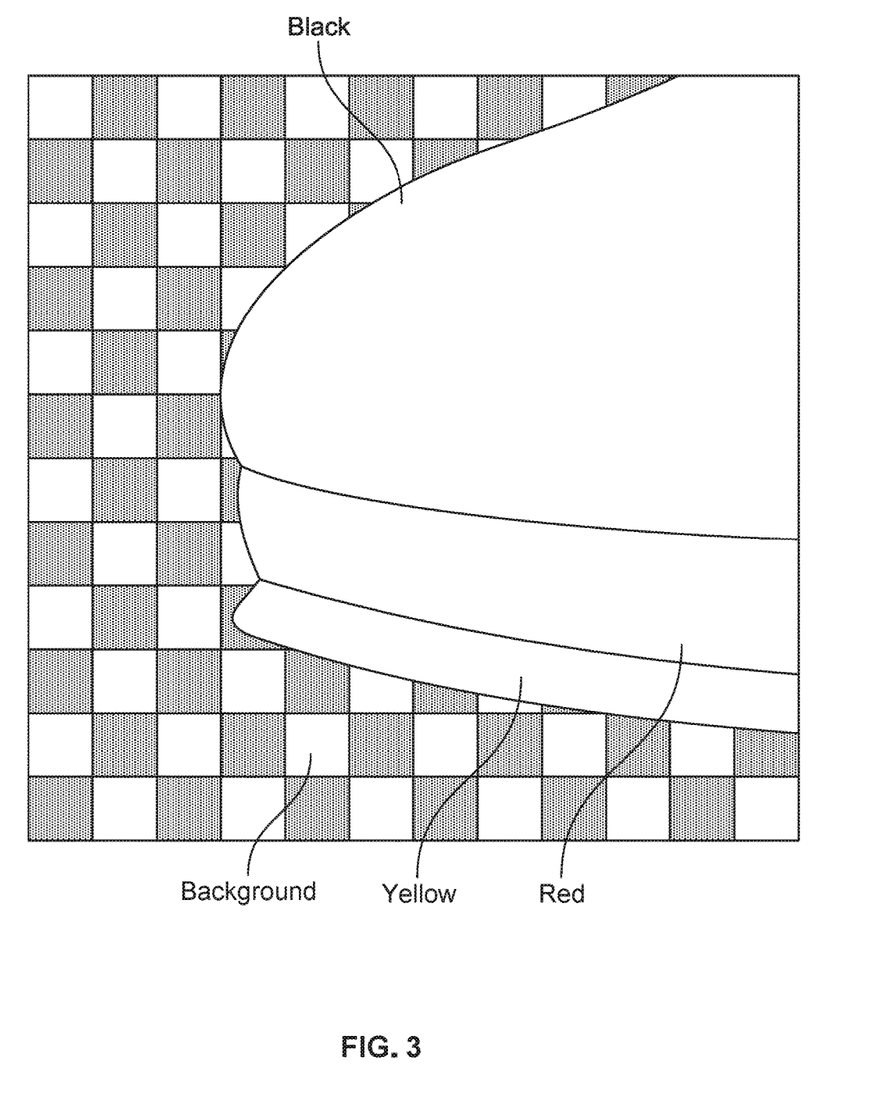
FIG. 3 is a diagram of an example of a local image.

FIG. 3 is a diagram of an example of a local image. As shown in FIG. 3, a color distribution is extracted from a local zone of the toe of the high-heeled shoe. For example, the color distribution includes: black=115, red=50, yellow=25, and background=65. Only colors which following quantification are greater than zero are displayed, and the color chart is a hypothetical concise color chart. Based on the three colors black, red, and yellow, assume that image 1, image 2, image 3, and image 4 are among the inverted index entries and that, moreover, the inverted list structure of the shoe toe local zone is as shown in Table 1 for these four images:

TABLE 1

| Black | Image 1 | 75 | Image 3 | 15 | . . . | |
|---|---|---|---|---|---|---|
| Red | Image 1 | 25 | Image 2 | 100 | Image 3 | 30 |
| Yellow | Image 2 | 65 | Image 4 | 45 | . . . | |

Other color entries in Table 1 are not shown. The server first searches for entries having a black color. Since black is weighted at 115 in the query product image, Image 1 receives a score of 115×75=8,625, and Image 3 receives a score of 115×15=1,725. In a corresponding manner, as a result of looking up entries having a color red, Image 1 receives a score of 50×25=1,250, Image 2 receives a score of 50×100=5,000, and Image 3 receives a score of 50×30=1,500. As a result of looking up entries having a color yellow, Image 2 receives a score of 25×65=1,625, and Image 4 receives a score of 25×45=1,125.

The above example only uses the toe local zone of the high-heeled shoe shown in FIG. 3 to implement sorting. Therefore, for this local zone, Image 1's score (based on black, red, and yellow) is 8,625+1,250=9,875, Image 2's score is 5,000+1,625=6,625, Image 3's score is 1,725+1,500=3,225, and Image 4's score is 1,125.

In this example:

$$|P| = \sqrt{\sum_{i=1}^{w} p_i^2} = \sqrt{115^2 + 50^2 + 25^2 + 65^2} = 143.44.$$

Assume that the moduli of the local zones corresponding to Images 1 through 4 are 174, 149.42, 212.67 and 214.77, respectively. Using formula (1), finding a similarity between Image 1 and the query product image is: 9875/(143.44×174)=39.6%; the similarities between Images 2 through 4 and the query product image are, respectively: 30.9%, 10.6%, and 3.65%. In other words, the similarity scores of Images 1 through 4 for the high-heeled shoe toe zone are obtained following the first sort according to operation 140. In the first sort, no query is to be issued for the background color, and the background color is not to appear in the inverted index.

In some embodiments, the server queries 8×8=64 local zones in succession, accesses the corresponding inverted index entries, and then totals up all the scores. The total is then divided by a modulus of the entire query product image and a modulus of the entire corresponding, looked-up candidate recommended product image, and this divided total serves as a first sort similarity score.

Following the first sort, assume that the server selects the 1,000 top-ranked images having the highest similarity scores. Then the server pairs each of the 1,000 top-ranked images and the query product image based on formula (2) and performs a color matching comparison on each pair. The server thus obtains color matching similarity scores. The server then sorts these 1,000 candidate recommended product images based on these color matching similarity scores and selects the 200 product images top-ranked by similarity value to serve as final recommended product images. Products corresponding to the final recommended product images are similar products that are recommended to the consumer using the process 100 for recommending online products.

Please note that process 100 is not limited to searching for same-category products, but also applies to searches for similar products that are similar in terms of color matching across categories. In addition, the process 100 can also achieve recommendations integrated with other features such as text, grain, style, etc. The various parameter settings involving the process 100 are not the only ones. The various parameter settings can be varied within a certain range.

Applications of the algorithm for measuring color matching similarity, i.e., formula (2), that is discussed in operation 150 are not limited to searching, but can also be applied to classifying, clustering, etc.

Figure 4:
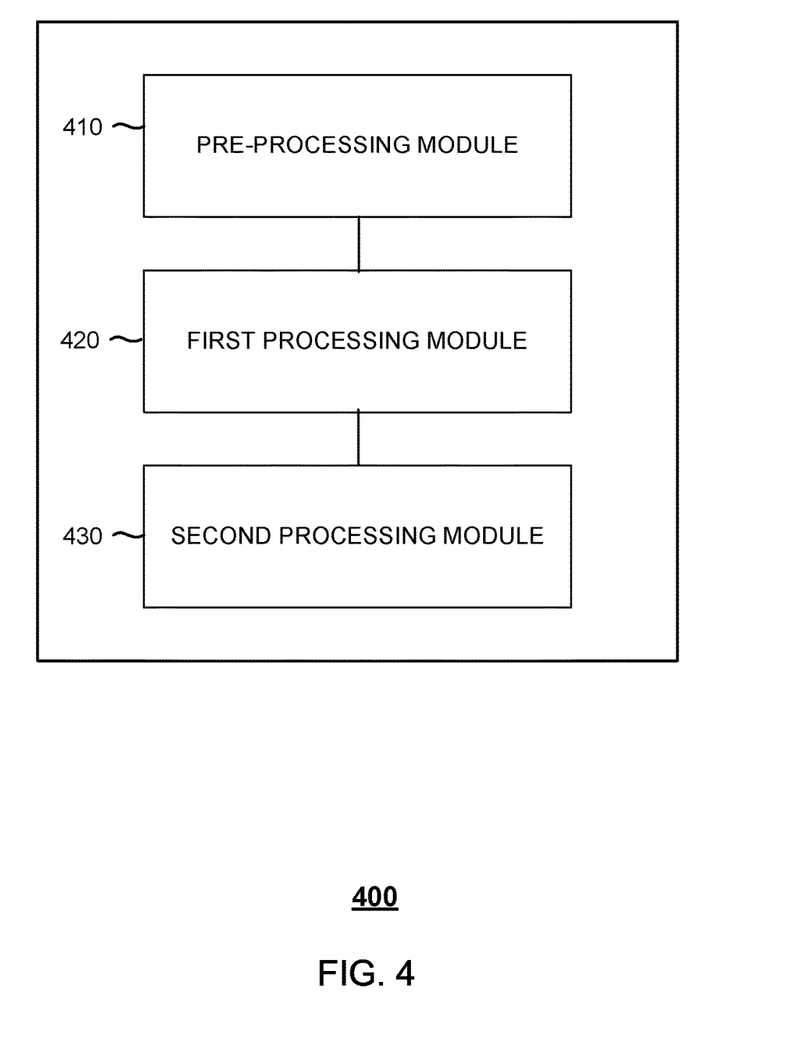
FIG. 4 is a structural block diagram of an embodiment of a device for recommending online products.

FIG. 4 is a structural block diagram of an embodiment of a device for recommending online products. In some embodiments, the device 400 implements the process 100 of FIG. 1 and comprises: a pre-processing module 410, a first processing module 420, and a second processing module 430.

In some embodiments, the pre-processing module 410 specifies a main product zone of a product image, divides the main product zone into a plurality of local zones, and individually extracts color features from each local zone.

In some embodiments, the first processing module 420 looks up candidate recommended product images sharing common characteristics with the query product image based on the color features of each local zone, and outputs the candidate recommended product images to the second processing module 430.

In some embodiments, the second processing module 430 matches, among the determined candidate recommended product images, the product images that are similar in terms of color matching to the query product image and regards the product images as recommended product images.

Figure 5:
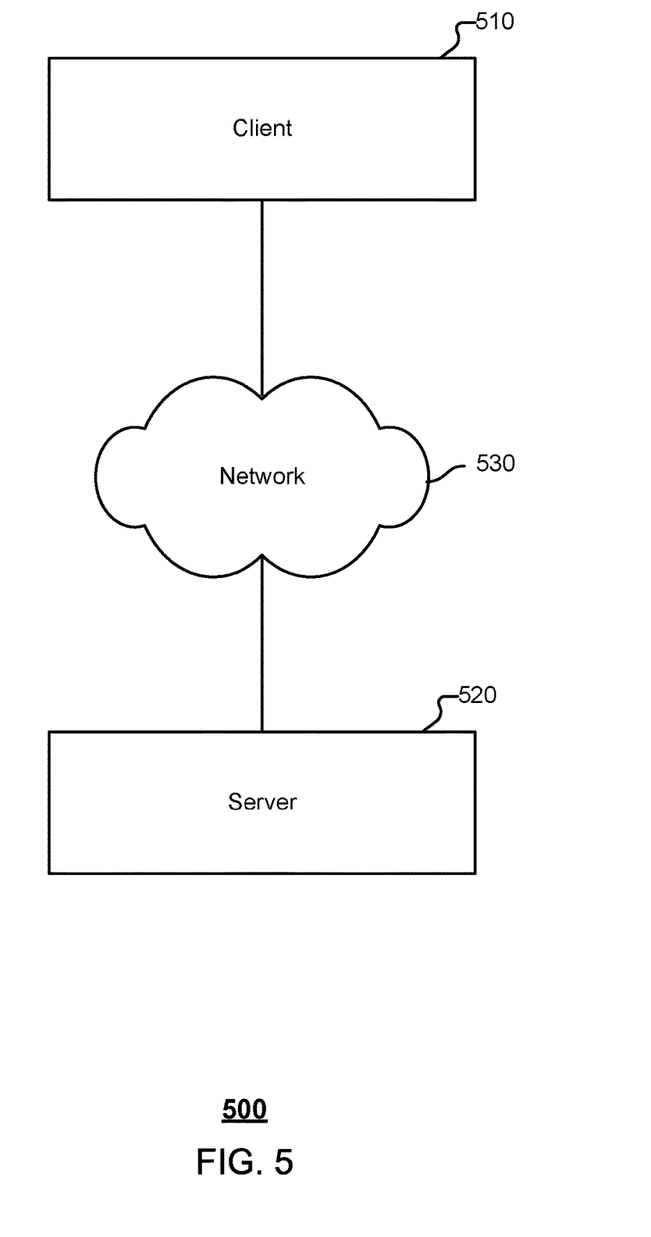
FIG. 5 is a diagram of an embodiment of a system for recommending online products.

FIG. 5 is a diagram of an embodiment of a system for recommending online products. In some embodiments, the system 500 includes a server 520 connected to a client 510 via a network 530. In some embodiments, the client 510 sends a query product image to the server 520. The server 520 for recommending an online product returns recommended product images back to the client 510 or stores the recommended product images in a database.

Figure 6:
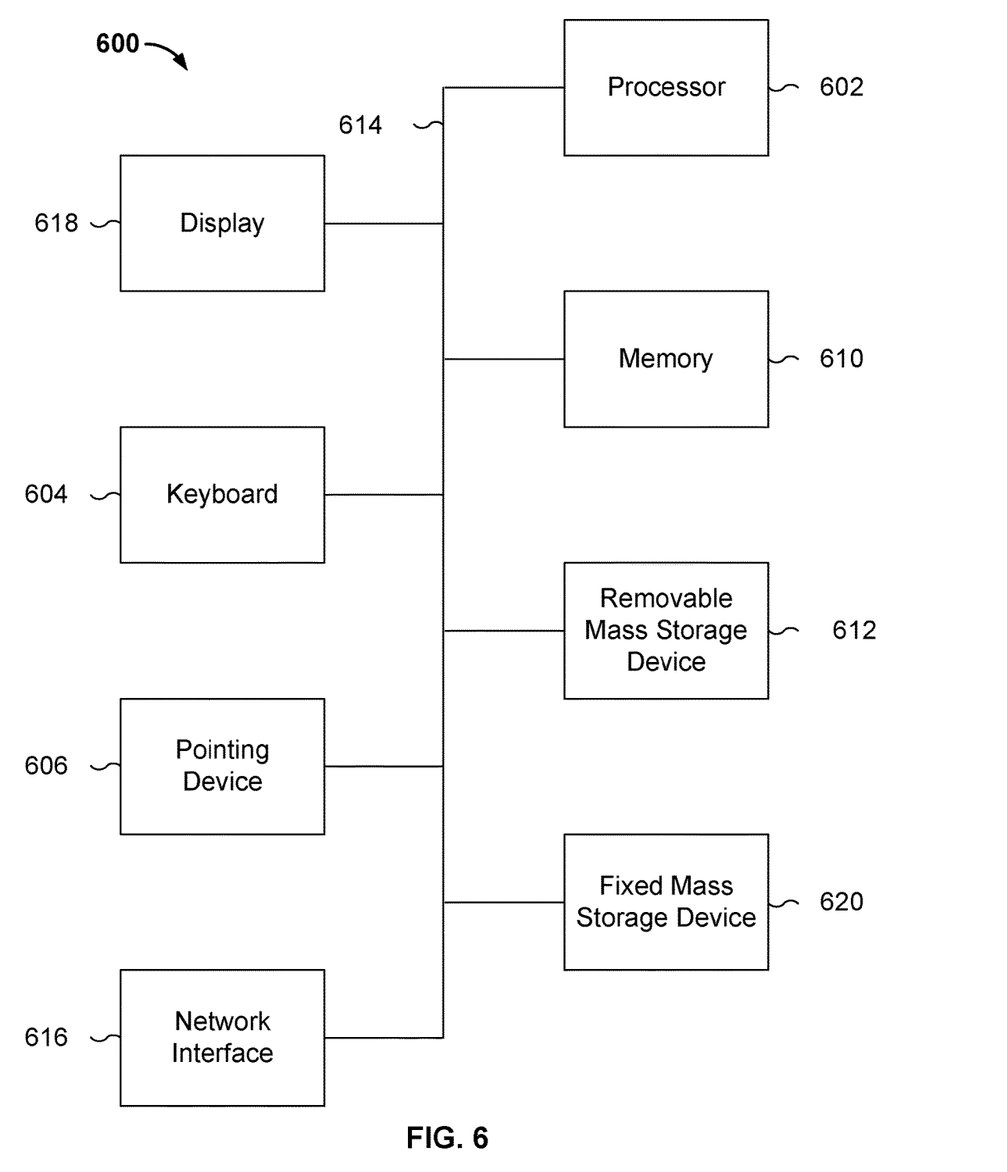
FIG. 6 is a functional diagram illustrating an embodiment of a programmed computer system for recommending online products.

FIG. 6 is a functional diagram illustrating an embodiment of a programmed computer system for recommending online products. As will be apparent, other computer system architectures and configurations can be used to recommend an online product. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for recommending online products, comprising:
    specifying, by a processor, a main product zone of a query product image;
    removing, by the processor, an image background from the main product zone to obtain a modified main product zone;
    calculating, by the processor, a center of gravity of the modified main product zone;
    dividing, by the processor, the modified main product zone into a plurality of local zones based on the calculated center of gravity;
    extracting, by the processor, color features from a local zone, wherein the extracting is performed by dividing the local zone into a plurality of portions using a hue, saturation, and brightness space;
    looking up, by the processor, candidate recommended product images sharing common characteristics with the query product image based on the color features of the local zone;
    matching, among the found candidate recommended product images, product images that are similar in terms of color matching to the query product image;
    providing the matched product images as recommended product images to a client for display; and
    establishing, by the processor an inverted index for the product images based on numbers of words in the product images, wherein:
        the main product zone is comprised of high-dimensional vectors, a high-dimensional vector representing a vector corresponding to a distribution of a plurality of dimensions, a dimension corresponding to a color.

2. The method for recommending online products as described in claim 1, wherein the looking up of the candidate recommended product images sharing the common characteristics with the query product image comprises:
    accessing entries of the inverted index corresponding to word frequencies that occur within a query product image P to calculate a similarity between the query product image P and a recommendable product image Q based on a cosine of an angle in a high-dimensional space formed by two high-dimensional vectors composed of the word frequencies of the query product image P and the recommendable product image Q; and
    selecting a top-ranked preset quantity M recommendable product images from the calculated similarity as candidate recommended product images, wherein M is an integer greater than one.

3. The method for recommending online products as described in claim 2, wherein the calculating of the similarities between the query product image P and the recommendable product image Q comprises:

$$sim(P, Q) = \sum_{i=1}^{w} \frac{p_i q_i}{|P||Q|},$$

wherein w represents a quantity of high-dimensional vectors contained in each product image, w=r×m, r represents a quantity of local zones into which each image has been divided, m represents a quantity of colors contained in the local zone, $\|$ represents a modulus operator, $$|P| = \sqrt{\sum_{i=1}^{w} p_i^2}, |Q| = \sqrt{\sum_{i=1}^{w} q_i^2},$$

represents a word frequency corresponding to an $i^{th}$ high-dimensional vector element within the query product image P, $q_i$ represents a word frequency corresponding to the $i^{th}$ high-dimensional vector element within the recommendable product image Q, and a background zone word frequency is zero.

4. The method for recommending online products as described in claim 3, wherein the matching of the product images that are similar in terms of color matching to the query product image comprises:
  performing matching calculations on one of the candidate recommended product images at a time;
  reducing differences between the one candidate recommended product image and the query product image with respect to these color intervals based on dominant hues shared by two images that are matched;
  strengthening differences between the one candidate recommended product image and the query product image with respect to these color intervals based on details or different color parts of the two images that are matched to obtain a color matching similarity colorsim (P,Q) for each candidate recommended product image Q and the query product image P; and
  performing one of the following:
    1) acquiring a preset quantity N product images top-ranked by similarity from among the candidate recommended product images and regarding the preset quantity N product images as recommended product images similar in terms of color matching to the query product image, wherein N is an integer greater than one; or
    2) selecting, from among the candidate recommended product images, product images whose similarity to the query product image is greater than a preset similarity threshold value and regarding the product images as recommended product images.

5. The method for recommending online products as described in claim 4, wherein the obtaining of the color matching similarity colorsim (P,Q) of each candidate recommended product image Q and the query product image P is:

$$colorsim(P, Q) = \sum_{j=1}^{r} colorsim(P_j, Q_j),$$

wherein r represents the quantity of local zones into which each image has been divided, $$colorsim(P_j, Q_j) = \chi^2(P_j, Q_j) = \frac{1}{2}\sum_{k=1}^{m} \frac{(p_k - q_k)^2}{p_k + q_k},$$

m representing the quantity of colors contained in the local zone.

6. A system for recommending online products, comprising:
  at least one processor configured to:
    specify a main product zone of a query product image;
    remove an image background from the main product zone to obtain a modified main product zone;
    calculate a center of gravity of the modified main product zone;
    divide the modified main product zone into a plurality of local zones based on the calculated center of gravity;
    extract color features from a local zone, wherein the extracting is performed by dividing the local zone into a plurality of portions using a hue, saturation, and brightness space;
    look up candidate recommended product images sharing common characteristics with the query product image based on the color features of the local zone;
    match, among the found candidate recommended product images, product images that are similar in terms of color matching to the query product image;
    provide the matched product images as recommended product images to a client for display; and
    establish an inverted index for the product images based on numbers of words in the product images, wherein:
      the main product zone is comprised of high-dimensional vectors, a high-dimensional vector representing a vector corresponding to a distribution of a plurality of dimensions, a dimension corresponding to a color; and
  a memory coupled to the at least one processor and configured to provide the at least one processor with instructions.

7. The system for recommending online products as described in claim 6, wherein to look up the candidate recommended product images sharing the common characteristics with the query product image comprises to:
  access entries of an inverted index corresponding to word frequencies that occur within a query product image P to calculate a similarity between the query product image P and a recommendable product image Q based on a cosine of an angle in a high-dimensional space formed by two high-dimensional vectors composed of the word frequencies of the query product image P and the recommendable product image Q; and
  select a top-ranked preset quantity M recommendable product images from the calculated similarity as candidate recommended product images, wherein M is an integer greater than one.

8. The system for recommending online products as described in claim 7, wherein to calculate the similarities between the query product image P and the recommendable product image Q comprises to calculate $$sim(P, Q) = \sum_{i=1}^{w} \frac{p_i q_i}{|P||Q|},$$

wherein w represents a quantity of high-dimensional vectors contained in each product image, w=r×m, r represents a quantity of local zones into which each image has been divided, m represents a quantity of colors contained in the local zone, || represents a modulus operator, $$|P| = \sqrt{\sum_{i=1}^{w} p_i^2}, |Q| = \sqrt{\sum_{i=1}^{w} q_i^2},$$

$p_i$ represents a word frequency corresponding to an $i^{th}$ high-dimensional vector element within the query product image P, $q_i$ represents a word frequency corresponding to the $i^{th}$ high-dimensional vector element within the recommendable product image Q, and a background zone word frequency is zero.

9. The system for recommending online products as described in claim 8, wherein to match the product images that are similar in terms of color matching to the query product image comprises to:

perform matching calculations on one of the candidate recommended product images at a time;

reduce differences between the one candidate recommended product image and the query product image with respect to these color intervals based on dominant hues shared by two images that are matched;

strengthen differences between the one candidate recommended product image and the query product image with respect to these color intervals based on details or different color parts of the two images that are matched to obtain a color matching similarity colorsim (P,Q) for each candidate recommended product image Q and the query product image P; and perform one of the following:

1) acquire a preset quantity N product images top-ranked by similarity from among the candidate recommended product images and regard the preset quantity N product images as recommended product images similar in terms of color matching to the query product image, wherein N is an integer greater than one; or 2) select, from among the candidate recommended product images, product images whose similarity to the query product image is greater than a preset similarity threshold value and regard the product images as recommended product images.

10. The system for recommending online products as described in claim 9, wherein the color matching similarity colorsim (P,Q) of each candidate recommended product image Q and the query product image P is:

$$colorsim(P, Q) = \sum_{j=1}^{r} colorsim(P_j, Q_j),$$

wherein r represents the quantity of local zones into which each image has been divided, $$colorsim(P_j, Q_j) = \chi^2(P_j, Q_j) = \frac{1}{2}\sum_{k=1}^{m} \frac{(p_k - q_k)^2}{p_k + q_k},$$

representing the quantity of colors contained in the local zone.

11. A computer program product for recommending online products, the computer program product being embodied in a tangible non-transitory computer readable storage medium and comprising computer instructions for:

specifying a main product zone of a query product image;

removing an image background from the main product zone to obtain a modified main product zone;

calculating a center of gravity of the modified main product zone;

dividing the modified main product zone into a plurality of local zones based on the calculated center of gravity;

extracting color features from a local zone, wherein the extracting is performed by dividing the local zone into a plurality of portions using a hue, saturation, and brightness space;

looking up candidate recommended product images sharing common characteristics with the query product image based on the color features of the local zone;

matching, among the found candidate recommended product images, product images that are similar in terms of color matching to the query product image;

providing the matched product images as recommended product images to a client for display; and establishing an inverted index for the product images based on numbers of words in the product images, wherein:

the main product zone is comprised of high-dimensional vectors, a high-dimensional vector representing a vector corresponding to a distribution of a plurality of dimensions, a dimension corresponding to a color.

12. The computer program product for recommending online products as described in claim 11, wherein the looking up of the candidate recommended product images sharing the common characteristics with the query product image comprises:

accessing entries of an inverted index corresponding to word frequencies that occur within a query product image P to calculate a similarity between the query product image P and a recommendable product image Q based on a cosine of an angle in a high-dimensional space formed by two high-dimensional vectors composed of the word frequencies of the query product image P and the recommendable product image Q; and selecting a top-ranked preset quantity M recommendable product images from the calculated similarity as candidate recommended product images, wherein M is an integer greater than one.

13. The computer program product for recommending online products as described in claim 12, wherein the calculating of the similarities between the query product image P and the recommendable product image Q comprises:

$$sim(P, Q) = \sum_{i=1}^{w} \frac{p_i q_i}{|P||Q|},$$

wherein w represents a quantity of high-dimensional vectors contained in each product image, w=r×m, r represents a quantity of local zones into which each image has been divided, m represents a quantity of colors contained in the local zone, || represents a modulus operator, $$|P| = \sqrt{\sum_{i=1}^{w} p_i^2}, |Q| = \sqrt{\sum_{i=1}^{w} q_i^2},$$

$p_i$ represents a word frequency corresponding to an $i^{th}$ high-dimensional vector element within the query product image P, $q_i$ represents a word frequency corresponding to the $i^{th}$ high-dimensional vector element within the recommendable product image Q, and a background zone word frequency is zero.

14. The computer program product for recommending online products as described in claim 13, wherein the matching of the product images that are similar in terms of color matching to the query product image comprises:

performing matching calculations on one of the candidate recommended product images at a time;

reducing differences between the one candidate recommended product image and the query product image with respect to these color intervals based on dominant hues shared by two images that are matched;

strengthening differences between the one candidate recommended product image and the query product image with respect to these color intervals based on details or different color parts of the two images that are matched to obtain a color matching similarity colorsim (P,Q) for each candidate recommended product image Q and the query product image P; and performing one of the following:

1) acquiring a preset quantity N product images top-ranked by similarity from among the candidate recommended product images and regarding the preset quantity N product images as recommended product images similar in terms of color matching to the query product image, wherein N is an integer greater than one; or
2) selecting, from among the candidate recommended product images, product images whose similarity to the query product image is greater than a preset similarity threshold value and regarding the product images as recommended product images.

15. The computer program product for recommending online products as described in claim 14, wherein the obtaining of the color matching similarity colorsim (P,Q) of each candidate recommended product image Q and the query product image P is:

$$colorsim(P, Q) = \sum_{j=1}^{r} colorsim(P_j, Q_j),$$

wherein r represents the quantity of local zones into which each image has been divided, $$colorsim(P_j, Q_j) = \chi^2(P_j, Q_j) = \frac{1}{2}\sum_{k=1}^{m} \frac{(p_k - q_k)^2}{p_k + q_k},$$

m representing the quantity of colors contained in the local zone.

* * * * *

UNITED STATES PATENT AND TRADEMARK OFFICE
CERTIFICATE OF CORRECTION

PATENT NO. : 9,984,402 B2
APPLICATION NO. : 14/461139
DATED : May 29, 2018
INVENTOR(S) : Yang Cao Page 1 of 1

It is certified that error appears in the above-identified patent and that said Letters Patent is hereby corrected as shown below:

On the Title Page

In Column 1, item (58), field of classification search, CPC, delete "G06C 30/0282; G06C 30/06; G06C 30/0631; G06C 30/0623; G06C 30/0643" and insert --G06Q 30/0282; G06Q 30/06; G06Q 30/0631; G06Q 30/0623; G06Q 30/0643--, therefor.

In page 2, Column 1, item (58), field of classification search, CPC, delete "G06C 30/0601; G06C 30/0625; G06C 30/0629" and insert --G06Q 30/0601; G06Q 30/0625; G06Q 30/0629--, therefor.

In the Specification

In Column 6, Line 3, delete "$|Q| = \sqrt{\sum_{i=1}^{w} p_i^2}$" and insert --$|Q| = \sqrt{\sum_{i=1}^{w} q_i^2}$--, therefor.

In the Claims

In Column 12, Line 62, Claim 3, before "represents a word frequency", insert --$p_i$--, therefor.

Signed and Sealed this
Thirtieth Day of October, 2018

Andrei Iancu
*Director of the United States Patent and Trademark Office*